May 12, 1959  H. GARTH  2,886,689
STEAM GENERATOR
Filed April 15, 1958  2 Sheets-Sheet 1
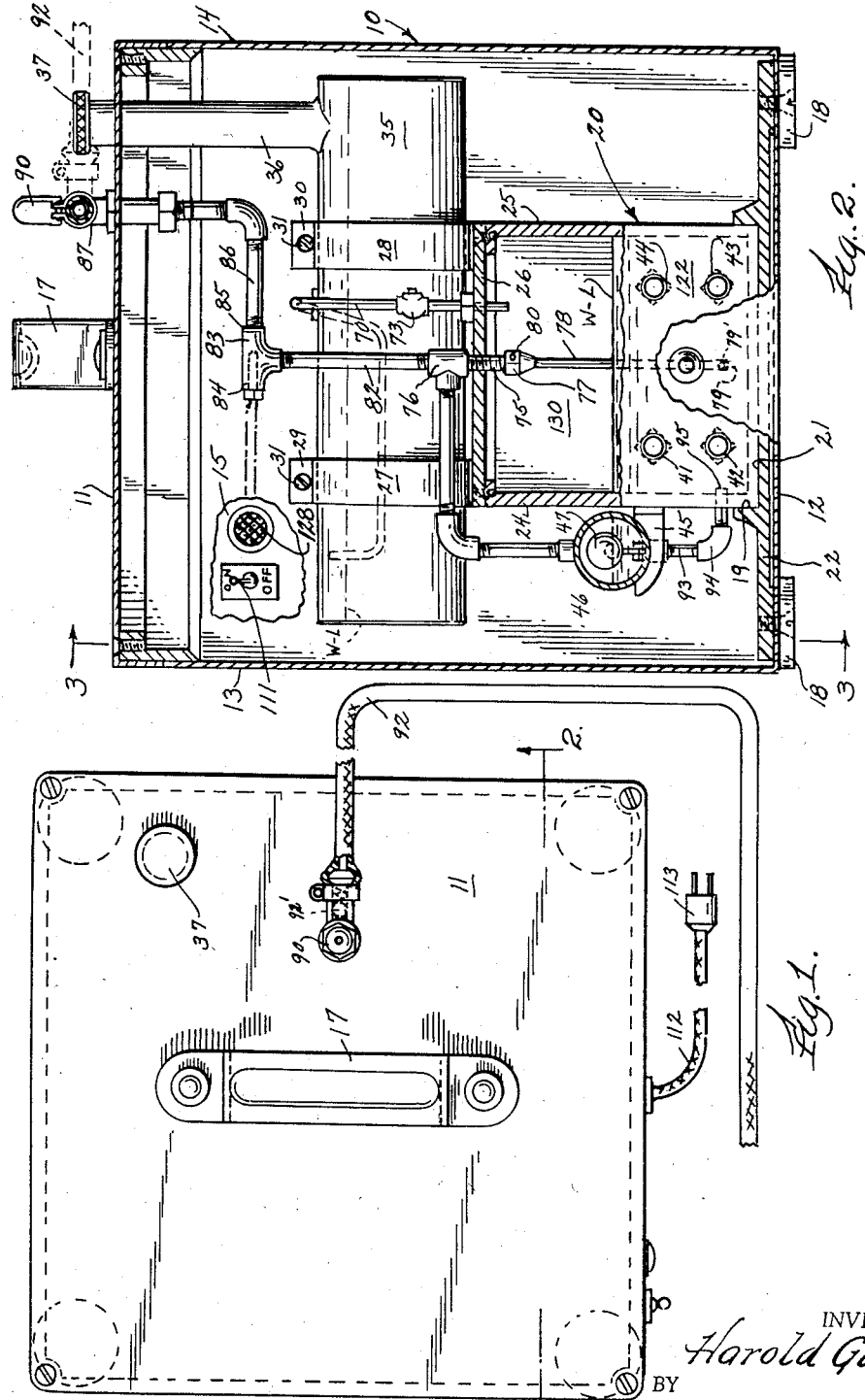
INVENTOR.
Harold Garth.
BY
Joseph B. Lindecker.
Attorney.

May 12, 1959  H. GARTH  2,886,689
STEAM GENERATOR
Filed April 15, 1958  2 Sheets-Sheet 2
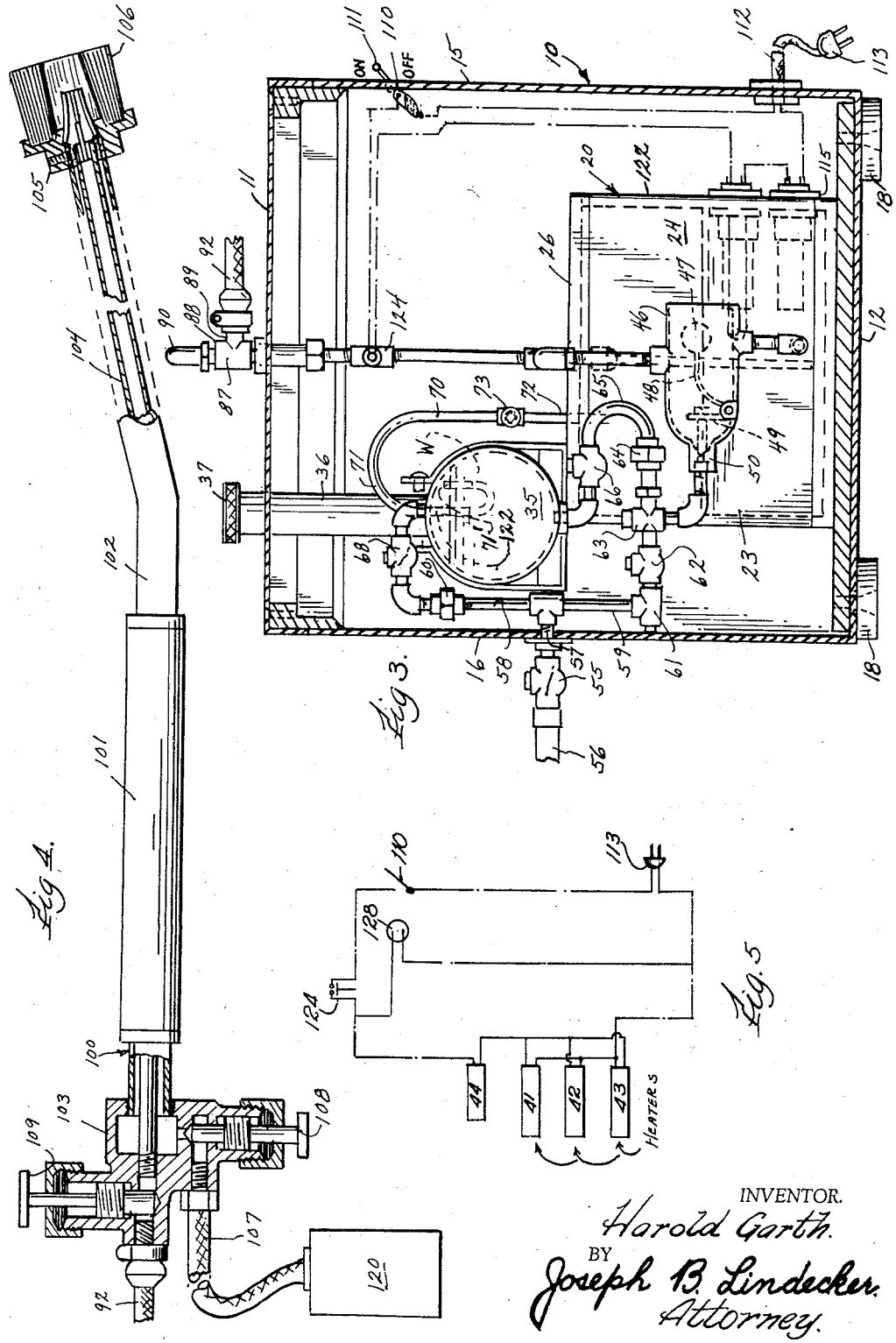
INVENTOR.
Harold Garth.
BY
Joseph B. Lindecker.
Attorney.

United States Patent Office 2,886,689
Patented May 12, 1959

2,886,689

STEAM GENERATOR

Harold Garth, Chicago, Ill.

Application April 15, 1958, Serial No. 728,680

13 Claims. (Cl. 219—38)

This invention relates generally to steam generators, particularly to a generator of the type commonly employed for supplying steam for cleaning purposes, which is simple, durable and comparatively inexpensive to manufacture.

An object of the invention is to provide a steam generator of relatively small size, which is simple in design and construction, yet highly practical and efficient in performing its function.

Another object of the invention is to provide a steam generator, of the character referred to, which is so constructed that it will supply steam vapor of the desired degree of saturation.

Another object of the invention is to provide a steam generator of the type indicated which is capable of automatically producing steam at a rapid rate and maintaining and supplying the produced steam at a substantially constant pressure.

Another object of the invention is to provide a steam generator having a closed vessel, or boiler, for containing a supply of water to be boiled, a heating element immersed within the lower portion of the vessel to heat the water, and a discharge pipe through which the generated steam flows to a dispensing nozzle and control valve.

Another object of the invention is to provide a steam generator of the class referred to, employing a filler tube through which water is introduced into the vessel when desired. Water is also received from the usual city water line if connected thereto.

Another object of the invention is to provide a steam generator, of the class referred to, with a normally open float valve in a float chamber assembled adjacent at the lower end of the boiler, the valve allowing the water to be introduced into the vessel so as to allow filling of the vessel only to a prescribed level.

Another object of the invention is to provide a steam generator in which the boiler is completely surrounded by a case, or jacket, thermal insulation material being employed between the boiler and the jacket to prevent heat losses.

Another object of the invention is to provide a steam generator in which the heating means consist of an electrical heating element, the operation of which is controlled by a pressure valve and a thermostat unit, the thermostat unit located within the boiler below the water-line and responsive to changes in the temperature of the water and level of the water line.

A further object of the invention is to provide a steam generator, of the character referred to, having a poppet type safety valve, said valve being adapted to open at a relatively high, dangerous pressure.

A further object is to provide a steam generator of the type specified which is compact, self-contained and portable to adapt it to be readily moved to selected locations for use, or storage, the jacket having a handle by which the generator may be carried.

It is also adapted for cleaning grease off of parts of automobiles such as the differential and transmission housings and for flushing out these housings so as to eliminate the old grease therefrom before filling with new grease.

Further objects of the invention will appear from the following description and from the drawing, which is intended for the purpose of illustration only, and in which:

Figure 1 is a top plan view of the improved steam generator, showing it embodied with a steam hose for use with a spray nozzle;

Figure 2 is a vertical sectional view of the steam generator taken substantially on line 2—2 of Fig. 1;

Figure 3 is a vertical sectional view of the steam generator shown in Figures 1 and 2 and taken substantially on line 3—3 of Fig. 2;

Figure 4 is an enlarged view of the spray nozzle, the nozzle handle, the steam supply valve, the chemical supply valve, and portions of flexible hoses attached to the valves; parts of the valves and spray nozzle shown in section;

Figure 5 is a diagrammatic view of the electrical circuit associated with the heating elements, the automatic control valve and a manually operated switch.

Referring to the drawing in detail, my portable, improved steam generator includes a metal case 10, having a removable top panel 11, a bottom wall 12, side walls 13 and 14, front wall 15 and rear wall 16. A strap type handle member 17 is secured by metallic means to the top panel 11 to facilitate carrying the generator to desired locations. Supporting blocks, or leg members 18, are secured to the bottom wall 12 adjacent the corners of the case 10.

A closed rectangular shaped vessel or boiler 20 is disposed within the case 10, the bottom wall 12 of the boiler is assembled upon a cast-metal platform 22 that is formed with a deeply recessed portion 19, said platform secured to the bottom wall 12 of the case 10. The boiler is formed with a front wall 122, a rear wall 23, side walls 24 and 25, and top cover 26. Arranged with the cover 26 is attached two securing bands 27 and 28 with open flange portions 29 and 30 at the top thereof and bolts 31 assembled therewith. A cylindrical water supply tank 35 is assembled in a horizontal manner upon the top cover 26 of the boiler 20 and secured thereon by said straps 27 and 28. The tank 35 is adapted to contain a quantity of water "W" which is introduced thereinto by city water line or by way of a filler tube 36 having its lower end connected with an opening in the upper cylindrical wall thereof, its upper end extending through and located above the top panel 11 of the case 10 and provided with a removable cap 37.

Arranged with the front wall 122 of the boiler, the heating elements and control unit are assembled. Three electric heaters 40, 41, 42 are inserted through openings in the front wall 122 and are tightly sealed with the wall 22 and extend horizontally within the boiler. Above the heater 43 is assembled a thermostat 44, the thermostat extending through an opening in the wall 122 and sealed therewith, said thermostat extending within the boiler below the water line "W–L." A bracket 45 is mounted upon the side wall 24 for supporting a float-valve chamber 46. A float ball 47 is mounted upon an arm 48 within the chamber 46 effecting operation of a valve 49 assembled in the rear end portion 50 of said chamber.

Referring to Figure 3, the illustrated steam generator includes a supply line check valve 55. Connected to the check valve 55 is one end of a flexible water supply hose 56. A nipple 57 extends through an opening in the side wall 16 of the case 10 and is liquid sealed therewith. Valve 55 is mounted on the outer end of said nipple 57 and a T-fitting is mounted within case 10 upon the opposite end of the nipple 57 and provides upper and lower outlets. Nipples 58 and 59 are assembled in vertical alignment with said T-fitting, the upper end of nipple 58 having a union fitting 60 assembled therewith, the lower end of nipple 59 having a T-fitting 61 assembled therewith to provide a horizontal outlet. A check valve 62 is connected with said T-fitting 61 in a horizontal plane. An X-fitting 63 is connected by a nipple to said check valve 62. Suitable piping connects said X-fitting with the rear end portion 50 of chamber 46. Connected to the lateral branch of this X-fitting is assembled a union fitting 64, coil pipe 65 and check valve 66. The check valve 66 is connected by an elbow and other pipe fittings with the bottom wall of said tank 35 to provide a water outlet means for the tank 35. A check valve 68 is suitably assembled with elbow and other pipe fittings with the union 60 and extends through the top wall of said tank 35 embodying a water inlet nipple 122. A pipe line 70 is assembled with its upper end portion 71 curved downwardly into said tank 35, said upper end portion 71 continuing as a coil below the water line of the tank 35; however, the outlet 71′ of the coil extends above the water line, the lower end 72 of the pipe 70 extends into the upper portion of the boiler 20, whereby the line 70 forming a pressure transfer line with a check valve 73 located intermediate its ends.

Referring to Figure 2, the boiler is shown with a nipple 75 extending upwardly and outwardly therefrom. A T-fitting 76 is assembled exterior of the boiler and with said nipple 75. Suitable piping connects the upper portion of chamber 46 with the lateral inlet of the T-fitting 76. The lower end of nipple 75 has a reducing coupling 77 and a length of copper tubing 78 assembled therewith. The lower end 79 of the tubing 78 has a ball check valve 79′ in its open end. An aperture 80 is formed in the coupling 77. The lower end 78 is always below the water line "W–L" and the aperture 80 is arranged in the vapor chamber above the water line.

Screwed into the upper end of the T-fitting 76 is a nipple 82, said nipple screwed into the lower outlet of a T-fitting 83 arranged with two lateral outlets 84 and 85. A pressure control switch 124 is arranged in the outlet 84, and a nipple 86 is screwed into the outlet 85. An elbow, pipe union, a pressure relief valve 124 and other fittings are assembled with and extend from the nipple 86 and through the upper wall 11 of the case 10 supporting a T-fitting 87 upon the exterior of the case with an upper outlet 88 and a lateral outlet 89. A safety valve 90 is screwed into said upper outlet 88 and a flexible steam line hose 92 is clamped upon pipe means extending from said outlet 89. Between said T-fitting 87 and the flexible hose 92 is inserted a 30-pound spring-loaded check valve 92′ to prevent discharge of steam from the hose if the pressure is below 30 pounds and also to prevent discharge of water before steam is formed.

Arranged with the lower end of the float-valve chamber 46 is a nipple 93, an elbow 94 and a nipple 95 forming a water supply line into the boiler 20, said nipple 95 extending below the water line therein.

Referring to Figure 4, the spray nozzle unit 100 is shown with a wooden handle portion 101, a hollow tube 102, a duplicate valve casting 103, a steam pipe 104, a nozzle 105, brush 106, flexible steam hose 92, flexible chemical liquid hose 107, chemical valve 108 and steam valve 109. A tank to hold a chemical cleaning fluid is diagrammatically shown by numeral 120.

Referring to Figure 3, the front panel 15 of the case 10 has embodied therewith a switch 110 for manual control of the electric heaters 41, 42 and 43 by which the water "W" within the boiler is heated to the temperature required to produce steam. The heating elements and said switch 110 are connected in an electric circuit shown by Fig. 5, which includes the switch 110 having an actuator in the form of a pivoted arm 111 projecting through the wall 15 of case 10. Also connected in the circuit is the thermostat 44 which extends horizontally below the water line. As will be noted, the thermostat 44, and the heating elements 41, 42 and 43 are connected in series in the circuit which also includes other units, which will be described later, and a two-wire cable 112 provided with suitable insulating elements and a plug element 113 by which the circuit can be connected to a source of electric current at a convenient outlet. The thermostat 44 and the heating elements 41, 42 and 43 are shown as having one end thereof secured to the wall 122 of the boiler 20 by suitable anchor plates 115, insulating elements interposed between the plates 115 and the wall 122. The heating element is of conventional design and is preferably formed of resistance wire extending inside metal tubes, as is well known in the art. Should the heating elements become corroded, or covered with scale, they may be removed for cleaning or replacement as desired. The space occurring between the boiler 20, the tank 35, and the case 10 is packed with a suitable thermal insulation material.

To prepare the steam generator for operation, the water supply hose 56, through which water from a city water pressure tap is received, is connected by suitable means with the valve 55. The water enters the boiler, when cold, by traveling through check valve 62, float valve chamber 46 and intervening piping. When the water reaches the desired level, the float valve 47 will close the shut-off valve 49, interrupting the flow of water into the boiler. Water will continue to flow into the water tank 35 through nipple 58, check valve 68 and nipple 122′ until the pressure in the tank is equal to the water pressure. Since the top chamber within the water tank is connected to the top chamber within the boiler by pipe line 70, the pressure in each chamber is substantially the same in the beginning. An air vent is not needed as the valve 109 on the steam line 104 can be depressed, relieving all the air within the vapor chamber of the boiler through aperture 80 leading to the pressure relief valve 124 and to the steam line hose 92. The city water pressure ranges from 25 to 60 lbs.

The boiler pressure is regulated by the suitable controls described above to remain between 40 and 60 lbs. The auxiliary water pressure tank 35 is controlled to operate at about 60 lbs. pressure, the pressure therein changing as the pressure of the steam in the boiler changes during its use by the operator.

To generate steam within the boiler, the operator will actuate the switch arm 111 to close the circuit, the pressure relief valve 124 and thermostat 44 will allow current to travel to the heating elements 41, 42 and 43 from the line 112. The check valves 55, 62 and 68 will prevent water from entering the supply tank as soon as the float valve has established the proper water-line level and pressure is being built up within the boiler. Check valve 66 is set to open at 30 lbs. pressure or at a pressure when valves 55, 62 and 68 are closed, whereby the water within the tank 35 can flow into the boiler if the shut-off valve 49 is opened by the float 47. The auxiliary tank 35 acts as a tempering tank as well as a supply tank, the water being able to flow to the boiler at any time it is needed, if allowed by the float valve, because the auxiliary tank pressure is controlled by relief valve 73 in the line 70, said valve 73 is in open position until the pressure in the tank 35 is greater than the pressure in the steam chamber in the boiler. A pump, or auxiliary means is not required to be used to force water from tank 35. If for any reason the pressure in the line becames dangerously high, the safety valve 90 will pop open and relieve the pressure. Also, when the pressure is too high in the output pipe lines, the pressure relief valve 124 will interrupt the current going to the heating elements. Also, should most of the water within the tank become consumed and the water-line of the boiler is dangerously low, the thermostat 44 will become uncovered by the low water and it will act to interrupt the current going to the heating elements. By the controls described, the steam generator is entirely automatic and will function satisfactorily under any conditions. A warning light, indicated at 128 in Figure 2, is interposed in the electric circuit for the heating elements, and is normally on, or lighted, when the heating elements are functioning and the pressure is building up within the boiler. Such automatic opening of the relief valve or the thermostat effecting the circuit will prevent further generation of steam within the boiler until the water in the tank is again replenished. When the generator is used as a stationary unit, the water hose 56 can be left in contact with the check valve 55, and with the shut-off valve 49 closed by the float 47, and valves 66 and 73 closed at any time due to low pressure within the boiler, the city water line pressure will open check valves 55, 62 and 68 allowing water to enter the tank 35; no water will run into the boiler as valve 73 is closed.

The case 10 having a carrying handle 17, and water supply, provides the entire apparatus with means to be readily and conveniently carried from place to place with one hand, when the apparatus is in use, or when transporting it from one place to another. The novel steam generator is found extremely practical and efficient in actual use.

The steam available within the vessel or boiler 20 is ready for cleaning various articles, or used as a wallpaper steamer or paint remover. More particularly it is portable so it can be used for thawing frozen radiators, carburetors, oil pumps and the like about a service station. The heating elements operate to maintain a steam pressure of substantially 60 pounds per square inch vapor pressure. The steam available within the boiler 20 is discharged when the operator opens the valve 109 controlling the nozzle unit 100. When the valve 109 is opened, the pressure within the upper portion of the discharge line, or nipple 75, above the water-level, is relieved, steam entering this line through the upper orifice, or aperture 80. The excess pressure within the vapor chamber 130 above the water line also forces water into the copper pipe tubing 78 through the bottom opening, or end 79 thereof, thus causing the column of water in the discharge tube 78 and nipple 75 to rise therein.

The water in the discharge tube and associated pipes adjacent thereto and connected therewith tends to boil because of the fact that the pressure in the outlet pipe is lower than in the vapor chamber 130. The dry steam entering the aperture 80 agitates and aspirates water at the upper end of the output line, in effect atomizing it and forming wet steam in the pipes 82, 86 and hose 92.

The rate of influx of steam from the vapor chamber 130 into the discharge line is determined by the size of the aperture 80. Likewise the rate of influx of water into the copper tube 78 is determined by the size of the open end 79 of tube 78. As a result of the co-action of the upper aperture 80 and lower opening 79, saturated or wet steam enters the discharge lines and is expelled through the nozzle unit 100 when the valve 109 is opened. The steam leaves the unit 100 by passing through tube 104, out the tapering nozzle and in contact with brush 106 or any other article attached thereto.

When chemical solutions are desired as cleaning substances along with the wet steam, the chemical liquid is placed within container 120 with hose 107 attached thereto. The venturi action at the outer end of tube 102 caused by the steam line 104 extending throughout the length of tube 102 and centrally located therein, causes a suction within the tube 102 controlled by valve 108, this effects the chemical liquid and it is fed along with the wet steam. This novel device gives the needed results without placing the chemical liquid within the boiler. Other types require the chemical to be placed in the boiler, where scale and corrosion take place, affecting heating elements and lowering their efficiency. Applicant does not place chemicals in the boiler; and if scale is formed upon the inner walls of the boiler, it is an insulation advantage since the heating units are within the boiler, not around the outside thereof.

It is thus seen that the present steam generator is highly practical and efficient in use. The generator is of a portable type but can be used as a stationery unit. The generator is designed to attain equilibrium rapidly and to maintain the pressure at a suitable high value.

I claim as my invention:

1. A portable steam generator comprising a case, a boiler for containing a supply of water and an auxiliary water supply tank within said case, said boiler and said auxiliary tank connected by a vapor-pressure pipe line connected above the water in said tank and the chamber above the water in said boiler, a check valve assembled intermediate the ends of said vapor-pressure pipe line, a heating element carried within the boiler for converting said water in said boiler to steam, a discharge nozzle carried by the generator in communication with the boiler and acting to discharge steam therefrom, valve means for controlling the discharge steam from said nozzle, a handle attached to the top of the generator to be gripped by one of the operator's hands for supporting the same, and a manually depressable operating valve means assembled with said nozzle operable by the other of said operator's hands for actuation of said valve.

2. A portable steam generator comprising a case, a boiler for containing a supply of water and an auxiliary water supply tank within said case, said boiler and said auxiliary tank connected by a vapor-pressure conveying pipe line connected above the water in said tank and the chamber above the water in said boiler, a check valve assembled intermediate the ends of said vapor-pressure conveying pipe line, a plurality of heating elements carried within the boiler for converting said water to steam, a discharge nozzle carried by the generator in communication with vapor chamber in the boiler and acting to discharge steam therefrom, valve means for controlling the discharge steam from said nozzle, said boiler and said auxiliary supply tank connected by a fluid conveying pipe line and also by said vapor pressure conveying pipe line, a check valve connected between said fluid conveying pipe line and said boiler, a handle attached to the top of the generator to be gripped by one of the operator's hands for supporting the same, and a manually depressable operating valve means assembled with said nozzle operable by the other of said operator's hands for actuating of said valve.

3. A portable steam generator comprising an inner metal boiler for containing a supply of water, an outer metal case enclosing said boiler in spaced relation thereto, conduit means communicating between the boiler and a nozzle outside of said case, valve means interconnected with said nozzle for manual control of any fluid flow through said conduit means, an auxiliary water supply tank mounted within said case, fluid conduit means connecting said water supply tank with said boiler for conveying water, said boiler and said auxiliary water supply tank connected by a vapor-pressure conveying pipe line connected above the water in said tank and the chamber above the water in said boiler, a check valve assembled intermediate the ends of said vapor-pressure conveying pipe line, valve means for controlling the flow of water to said boiler, insulating means filling the interspace between the tank, the boiler and said case, said boiler having side, top and bottom walls, an immersion type heating element disposed within the boiler for intimate heat transfer to the water in said boiler.

4. A steam producing generator, comprising a case, a boiler and a water supply tank in said case, an immersion type electric heating element in said boiler for applying heat to the water in said boiler, a flexible steam hose extending from said boiler, a manual control valve on the outer end of said steam hose for controlling the flow of steam from the boiler, automatic means for permitting the filling of said boiler with water while it contains steam, said means comprising a pressure pipe line assembled between the chamber above the water in said tank and the chamber above the water in said boiler, a filler pipe line connected to said boiler and said auxiliary tank, a check valve connected between said filler pipe line and said auxiliary tank, a check valve connected between said filler pipe line and said boiler, a check valve between said auxiliary tank and said boiler, a check valve assembled intermediate the ends of said pressure pipe line, and a float in a float chamber for controlling the quantity of water in the boiler.

5. In a steam producing generator comprising a metal case, a boiler and a water supply tank in said case, a float for controlling the waterline in said boiler, an immersion type electric heating element in said boiler for applying heat to the water in said boiler, a flexible steam hose extending from said boiler, a manual control valve on the outer end of said steam hose for controlling the flow of steam from the boiler and automatic means for permitting the filling of said boiler with water while it contains steam, said means comprising a pressure pipe line assembled between the chamber above the water in said tank and the chamber above the water in said boiler, a plurality of check valves arranged between the source of water supply and said boiler and said supply tank, and a check valve between said boiler and said tank, and a valve intermediate the ends of said pressure pipe line, and a float valve for governing the height of the waterline in said boiler.

6. In a steam producing generator comprising a case, a boiler in said case, immersion type heating means for heating said boiler, a flexible steam hose extending from said boiler, an auxiliary water supply tank and means for permitting the filling of said boiler with water from said auxiliary water supply tank while the boiler contains steam, said means comprising a pressure conduit connected with the chamber above the water in said tank with the chamber above the water in said boiler, a water supply line connected to said auxiliary tank, a check valve connected between said source of supply and said tank, a check valve between said tank and said boiler, a check valve between said source of water supply and said boiler, a float valve between the latter check valve and said boiler, and a check valve intermediate the ends of said pressure conduit whereby the pressure of the steam entering the chamber above the water in said tank will force water into said boiler whenever said float valve permits.

7. A steam generator including a vessel for containing water, a case surrounding the vessel, an auxiliary water supply tank in said case, said vessel and said auxiliary tank connected by a vapor-pressure pipe line connected above the water in said tank and the chamber above the water in said vessel, a check valve assembled intermediate the ends of said vapor-pressure pipe line, insulating material between the vessel and the tank and the case, immersion type electrical heating elements within said vessel, and an electric circuit for the heating elements, a thermostat element including a switch connected in said circuit, said thermostat element being responsive to the level of the water in said vessel, said vessel and said auxiliary tank connected by a fluid conveying pipe line, a check valve between said fluid conveying pipe line and said vessel, and a discharge pipe extending into the vessel to a point near the bottom of said vessel and beneath the normal water level therein and having its lower end open through which fluid within the vessel can enter the pipe in liquid form to be discharged exteriorly of the vessel, a check valve in the lower end of said pipe, and at least one hole above the water level in said vessel through which steam within the vessel can enter the pipe to be discharged with said water exteriorly of the vessel.

8. A steam generator including a boiler for containing water, a metal case surrounding the boiler, an auxiliary water supply tank in said case, said boiler and said auxiliary tank connected by a vapor-pressure pipe line connected above the water in said tank and the chamber above the water in said boiler, a check valve assembled intermediate the ends of said vapor-pressure line, insulating material between the boiler and the tank and the case, immersion type electrical heating elements within said boiler, and an electric circuit for the heating elements, a thermostat element including a switch connected in said circuit, said thermostat element being responsive to the level of the water in said boiler, said boiler and said auxiliary tank connected by a fluid conveying pipe line, a check valve between said fluid conveying pipe line and said boiler and a discharge pipe extending into the boiler to a point near the bottom of said boiler and beneath the normal water level therein and having its lower end open through which fluid within the boiler can enter the pipe in liquid form to be discharged exteriorly of the boiler, a check valve in the lower end of said pipe and at least one hole above the water level in said boiler through which steam within the boiler can enter the pipe to be discharged exteriorly of the boiler, said steam and said water being discharged as a cleaning element in combination with each other.

9. A steam generator including a vessel for containing water, a case surrounding the vessel, an auxiliary water supply tank in said case, said vessel and said auxiliary tank connected by a vapor-pressure pipe line connected above the water in said tank and the chamber above the water in said vessel, a check valve arranged intermediate the ends of said vapor-pressure pipe line, insulating material between the vessel and the tank and the case, immersion type electrical heating elements within said vessel, and an electric circuit for the heating elements, said circuit including a thermostat element, a pressure relief valve, and a switch, said thermostat element being responsive to temperature of fluid within the vessel, said vessel and said auxiliary supply tank connected by a fluid conveying pipe line, a check valve connected between said fluid conveying pipe line and said vessel, a pressure relief valve responsive to the pressure in the discharge line, and a discharge pipe extending into the vessel to a point near the bottom of said vessel and beneath the normal water level therein and having at least two openings, one of the openings in the bottom end of said discharge pipe through which fluid within the vessel can enter the pipe in liquid form, and one of the openings arranged above the water level in said vessel through which steam can enter, both the water and the steam to be discharged in combined form exteriorly of the vessel.

10. A steam generator including a boiler for containing water, a case surrounding the boiler, an auxiliary water supply tank in said case, insulation material between the boiler, the tank and the case, immersion type electric heating elements within the boiler, an electrical circuit for the heating elements, a thermostat element including a pressure responsive means and a switch connected in said circuit, said thermostat being responsive to the temperature and the level of the fluid within the boiler, water supply means by which water can be introduced into the boiler and the auxiliary supply tank, float means in a float chamber connected with said boiler operative to prevent filling above a predetermined level, said boiler and said auxiliary supply tank connected by a fluid conveying pipe line, a check valve connected between said fluid conveying pipe line and said boiler, said float chamber arranged between said water supply means and said boiler, the space between the water level and the upper end of the boiler constituting a vapor chamber, said boiler and said auxiliary tank connected by a vapor-pressure conveying pipe line connected above the water in said tank and the chamber above the water in said boiler, a check valve arranged intermediate the ends of said vapor-pressure conveying pipe line, a safety valve communicating with said vapor chamber and set to open at a predetermined relatively high vapor pressure, a vapor pressure line communicating between the space above the water level in said auxiliary tank and the water level in said chamber, a check valve arranged between the ends of said vapor pressure line, and a discharge pipe extending into the boiler, said discharge pipe having at least one hole disposed within said vapor chamber through which steam can enter said discharge pipe from said chamber, said discharge pipe also having an opening in its lower end and arranged beneath said water level in said boiler through which water can enter said discharge pipe, a check valve in the lower end of said discharge pipe whereby steam and water can be discharged together as wet steam for cleaning purposes.

11. A steam generator including a vessel for containing water, a jacket surrounding the vessel, an auxiliary water supply tank within said jacket, insulation material between the vessel and the tank and the jacket, immersion type electric heating elements within the lower region of the vessel, an electrical circuit for the heating elements, a thermostat element including a switch connected in said circuit, said thermostat being responsive to the temperature of fluid within the vessel, filler means by which water can be introduced into the vessel, said filler means being connected to a float means operative to prevent filling above a predetermined level, said vessel and said auxiliary supply tank connected by a fluid conveying pipe line, a check valve connected between said fluid conveying pipe line and said vessel, the space between the water level and the upper end of the vessel constituting a vapor chamber, said vessel and said auxiliary tank connected by a vapor-pressure conveying pipe line connected above the water in said tank and the chamber above the water in said vessel, a check valve arranged intermediate the ends of said vapor-pressure conveying pipe line, the space between the water level and the upper end of said tank constituting an air chamber, a safety valve communicating with said vapor chamber and set to open at a predetermined relatively high vapor pressure, a vapor conduit communicating with said air chamber and said vapor chamber, a check valve intermediate the ends of said conduit, and a discharge pipe extending into the vessel, said discharge pipe having at least one hole disposed within said vapor chamber through which steam can enter said discharge pipe from said chamber, said discharge pipe having its power end open and controlled by a check valve therein beneath said water level through which water can enter said discharge pipe; whereby the steam and the water can be discharged together as a wet steam for effecting a cleaning action upon an object coming into contact therewith.

12. A portable steam generator, a case including a vessel for holding a liquid, an auxiliary water supply tank connected with said vessel, means for insulating the vessel in said case from the atmosphere, means extending into the vessel from said tank for introducing the liquid into the vessel to a particular level in the vessel, a float means for controlling the level in the vessel, said vessel and said auxiliary supply tank connected by a fluid conveying pipe line, a check valve connected between said fluid conveying pipe line and said vessel, means for heating the liquid within the vessel to produce a vaporization of liquid into the space between the liquid level and the top of the vessel, a vapor pressure conduit connecting the area above the water in said tank with the area above the water in said vessel, a check valve intermediate the ends of said vapor pressure conduit, a safety valve for passing vapor out of the vessel at pressures above a certain particular value, and a discharge pipe communicating at one end with the atmosphere and at the other end with the liquid in the vessel for guiding steam out of the vessel, there being at least a first opening in the discharge pipe at a position within the vessel and above the liquid level to receive the steam for movement through the discharge pipe, the lower end of said discharge pipe being open and controlled by a check valve therein at a position within the vessel and below the liquid level to receive the liquid for aspiration by the vapor and for movement through the pipe, the opening in the end of the discharge pipe below the water level being of a size relative to the openings in the discharge pipe above the water level to control the relative saturation of steam passing through the pipe exteriorly of the vessel.

13. A portable steam generator, including a boiler for holding a liquid, an auxiliary liquid supply tank, means for insulating the boiler and the tank from the atmosphere, pipe means extending into the boiler from the auxiliary supply tank for introducing the liquid into the boiler, a check valve in said pipe means, a float valve for limiting the level of the liquid in the boiler, the space between the water level and the upper end of the boiler constituting a vapor chamber, the space between the water level and the upper end of the tank constituting an air chamber, means for heating the liquid to produce a vaporization of the liquid into the vapor chamber, a thermostat disposed in the liquid in the boiler for controlling the operation of the heating means for temperatures above a particular value, a vapor pressure equalizing conduit connecting said air chamber with said vapor chamber, a check valve arranged at the end of said vapor pressure equalizing conduit, a safety valve for passing vapor out of the vessel at pressures above a particular value in said boiler, and a discharge pipe extending from a position above the vessel through the vessel to a position below the level of the liquid, there being a hole in the pipe at a position above the liquid level to produce a passage of vapor out of the vessel, there being a hole in the bottom end of the pipe at a position below the liquid level to produce a movement of liquid through the pipe for aspiration by the vapor, a check valve arranged in the bottom end of said pipe, the size of the holes effecting control of the saturation of the vapor passing through the pipe.

References Cited in the file of this patent

UNITED STATES PATENTS

| 2,306,766 | Van Tries | Dec. 29, 1942 |
| 2,443,417 | Duncan | June 15, 1948 |
| 2,627,015 | Hackman | Jan. 27, 1953 |
| 2,639,365 | Krampe et al. | May 19, 1953 |
| 2,785,271 | Baly | Mar. 12, 1957 |